United States Patent
Hsiao et al.

(10) Patent No.: US 8,902,381 B2
(45) Date of Patent: Dec. 2, 2014

(54) BACKLIGHT MODULE AND LIQUID CRYSTAL DISPLAY DEVICE

(71) Applicant: Shenzhen China Star Optoelectronics Technology Co., Ltd., Guangdong (CN)

(72) Inventors: Yu-chun Hsiao, Shenzhen (CN); Quan Li, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 161 days.

(21) Appl. No.: 13/642,552

(22) PCT Filed: Oct. 15, 2012

(86) PCT No.: PCT/CN2012/082956
§ 371 (c)(1),
(2), (4) Date: Dec. 24, 2012

(87) PCT Pub. No.: WO2014/056237
PCT Pub. Date: Apr. 17, 2014

(65) Prior Publication Data
US 2014/0104539 A1    Apr. 17, 2014

(30) Foreign Application Priority Data
Oct. 11, 2012    (CN) .............................. 201210384373

(51) Int. Cl.
*G02F 1/1335*    (2006.01)
(52) U.S. Cl.
CPC .............................. *G02F 1/133602* (2013.01)
USPC .................................. 349/67; 349/58; 349/65
(58) Field of Classification Search
CPC .. G02B 6/0031; G02B 6/0055; G02B 6/0021; G02B 6/0086; G02F 1/133308; G02F 1/133615; G02F 1/1333; G02F 1/157; G02F 1/1335; G02F 1/133608; G02F 1/133504; G02F 1/133524; G02F 1/133553; G02F 2001/133314; G02F 2001/133317; G02F 2001/133553; G02F 2001/133308; G02F 2201/46; G02F 2201/465; F21V 7/00; F21V 13/04; F21V 13/14; F21V 21/00; F21V 15/01; H04N 5/64; H04N 5/655
USPC ........... 362/97.1, 609, 296.01, 633, 341, 615, 362/623, 433, 632, 634; 349/65, 62, 61, 67, 349/58
See application file for complete search history.

(56) References Cited

U.S. PATENT DOCUMENTS

| 7,819,574 B2 * | 10/2010 | Yoo et al. ....................... 362/633 |
| 2008/0143918 A1 * | 6/2008 | Kim ................................ 349/58 |

* cited by examiner

*Primary Examiner* — Thoi Duong
(74) *Attorney, Agent, or Firm* — Andrew C. Cheng

(57) ABSTRACT

The present invention provides a backlight module comprises a waveguide, a reflector, and elastic members. Wherein the elastic members are used to arranged on corners of the waveguide, and the reflector is arranged on a side of the waveguide facing the elastic members. And wherein each of the elastic members is provided with a slot in a surface facing the reflector, and the reflector is provided with tabs corresponding to each of the slots so as to be securely received within the slots. The present invention further provides a liquid crystal display device incorporated with such a backlight module. By this arrangement, the backlight module become more reliable, and more suitable for narrow-boarder design. The utilization of the reflector is also enhanced.

13 Claims, 3 Drawing Sheets

BACKLIGHT MODULE AND LIQUID CRYSTAL DISPLAY DEVICE

FIELD OF THE INVENTION

The present invention relates to a technical field of liquid crystal display device, and more particularly, to a backlight module, and a liquid crystal display device incorporated with such a backlight module.

BACKGROUND OF THE INVENTION

In a backlight module, a reflector can enhance the efficiency rate of the light source. If a reflector is altered, re-positioned as compared to its originally designed position, then the distribution and homogeneousness of the light will be negatively affected, and the displacing panel could be seen with strips of brightness and darkness. As a result, securely positioning of the reflector is also very important to a function of a liquid crystal display device.

In the current prior art, the reflector is positioned through an interengagement between a notch and a tab or embossment arranged between the backplate and the reflector. Sometimes, a rivet is also applied.

On the other hand, the reflector is also positioned with a double-side tape so as to attach the reflector to the backlight module.

It has been found after a long-time observation that the position by interengagement between the notch and tab is detrimental to the narrow-boarder design. On the other hand, it is required to have the waveguide to be defined with a waveguide, and which will create other unwanted situations. In addition, this will also increase the cast of the waveguide. The position of using double-tape is vulnerable to heat. As a result, after a period of usage, the position is lost.

SUMMARY OF THE INVENTION in order to resolve the technical issues encountered by the prior art, the present invention provides a backlight module and a liquid crystal display device incorporated with the backlight module. The reliability of the reflector within the backlight module can be ensured, and the utilization of the light is also upgraded. The present invention is specially suitable for the narrow-boarder design.

In order to resolve the technical issue encountered by prior art, the present invention provides a technical solution by introducing a backlight module comprises a waveguide, a reflector, and elastic members. Wherein the elastic members are used to arranged on corners of the waveguide, and the reflector is arranged on a side of the waveguide facing the elastic members. Wherein each of the elastic members is provided with a slot in a surface facing the reflector, and the reflector is provided with tabs corresponding to each of the slots so as to be securely received within the slots. Wherein a dotted line is arranged between each of the tabs and the reflector; and wherein the slot has a rectangular shape and is perpendicular to a surface of the waveguide facing the reflector.

Wherein the elastic members is made from rubber.

Wherein the elastic member has a cubic configuration, and a corner is removed to create a cube with trough, and the slot is defined at a bottom of a sidewall of the trough.

In order to resolve the technical issue encountered by prior art, the present invention provides a technical solution by introducing a backlight module comprises a waveguide, a reflector, and elastic members. Wherein the elastic members are used to arranged on corners of the waveguide, and the reflector is arranged on a side of the waveguide facing the elastic members. And wherein each of the elastic members is provided with a slot in a surface facing the reflector, and the reflector is provided with tabs corresponding to each of the slots so as to be securely received within the slots.

Wherein a dotted line is arranged between each of the tabs and the reflector.

Wherein the slot has a rectangular shape and is perpendicular to a surface of the waveguide facing the reflector.

Wherein the elastic members is made from rubber.

Wherein the elastic member has a cubic configuration, and a corner is removed to create a cube with trough, and the slot is defined at a bottom of a sidewall of the trough.

In order to resolve the technical issue encountered by prior art, the present invention provides an technical solution by introducing a liquid crystal display device which comprises a displaying panel disposed in a position of a waveguide opposite to a reflector. A backlight module, disposed below the displaying panel, and includes a waveguide, a reflector, and elastic members. Wherein the elastic members are used to arranged on corners of the waveguide, and the reflector is arranged on a side of the waveguide facing the elastic members. And wherein each of the elastic members is provided with a slot in a surface facing the reflector, and the reflector is provided with tabs corresponding to each of the slots so as to be securely received within the slots.

Wherein a dotted line is arranged between each of the tabs and the reflector.

Wherein the slot has a rectangular shape and is perpendicular to a surface of the waveguide facing the reflector.

Wherein the elastic members is made from rubber.

Wherein the elastic member has a cubic configuration, and a corner is removed to create a cube with trough, and the slot is defined at a bottom ala sidewall of the trough.

The present invention can be concluded with the following advantages. As compared to the prior art, the present invention utilizes a cubit elastic member defined with a slot so as to accommodate a tab from the reflector. With the insertion of the tab from the reflector into the slot of the elastic member, the reflector can be readily and reliably positioned. By this arrangement, the backlight module become more reliable, and more suitable for narrow-boarder design. The utilization of the reflector is also enhanced.

DETAILED DESCRIPTION OF PREFERRED EMBODIMENT

In order to give a better and thorough understanding to the whole and other intended purposes, features and advantages of the technical solution of the present invention, detailed description will be given with respect to preferred embodiments provided and illustrated herebelow in accompanied drawings. Apparently, with the spirit of the embodiments disclosed, person in the skilled in the art can readily come out with other modifications as well as improvements without undue experiment. In addition, other drawings can be readily achieved based on the disclosed drawings.

Figure 1:
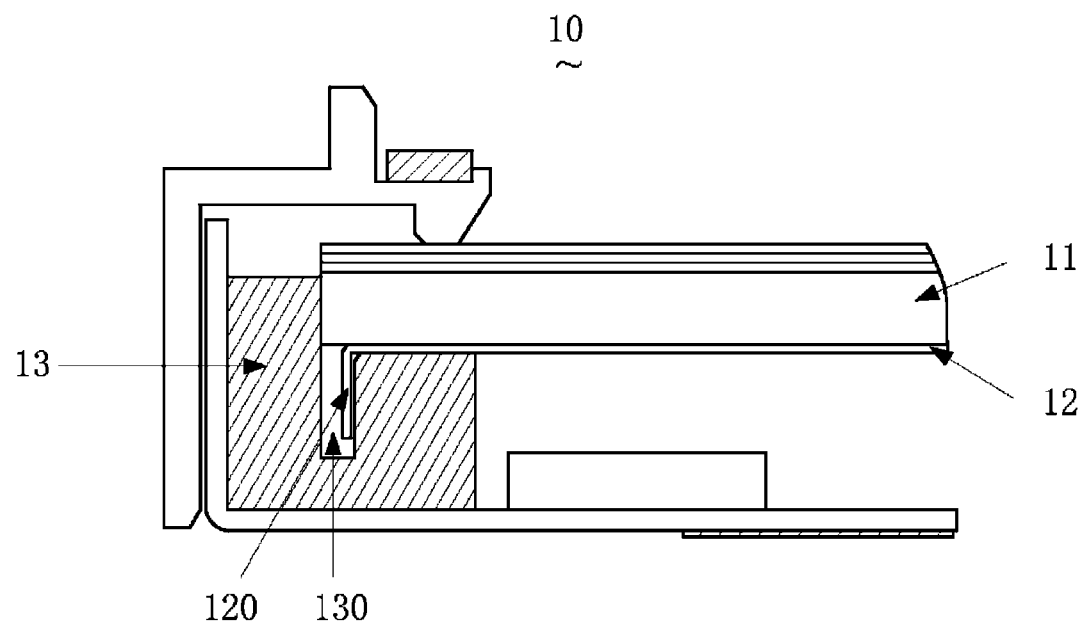
FIG. 1 is a partial, cross sectional view of a backlight module made in accordance with the present after it is assembled.
Figure 2:
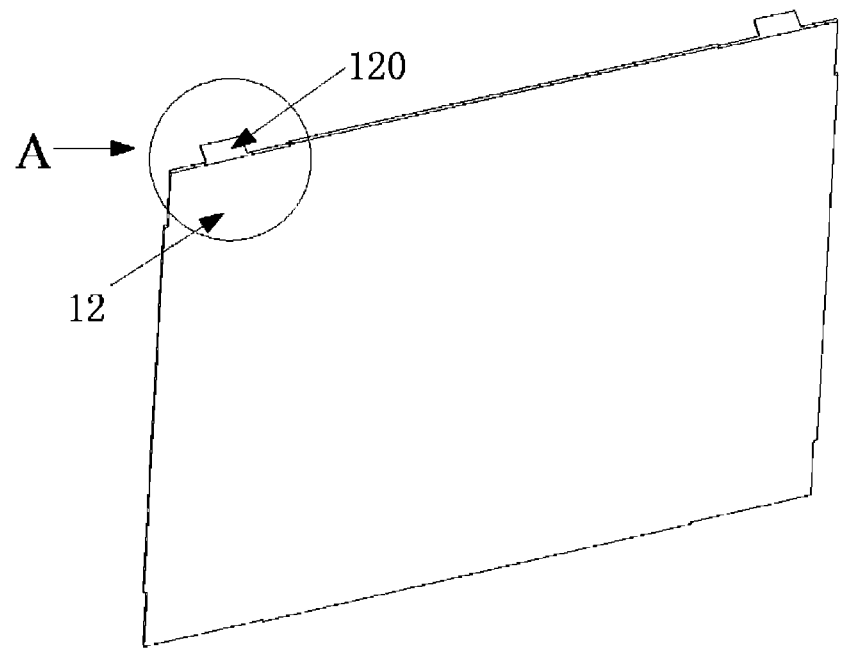
FIG. 2 is a perspective view of a reflector used in the backlight module made in accordance with the present invention.
Figure 3:
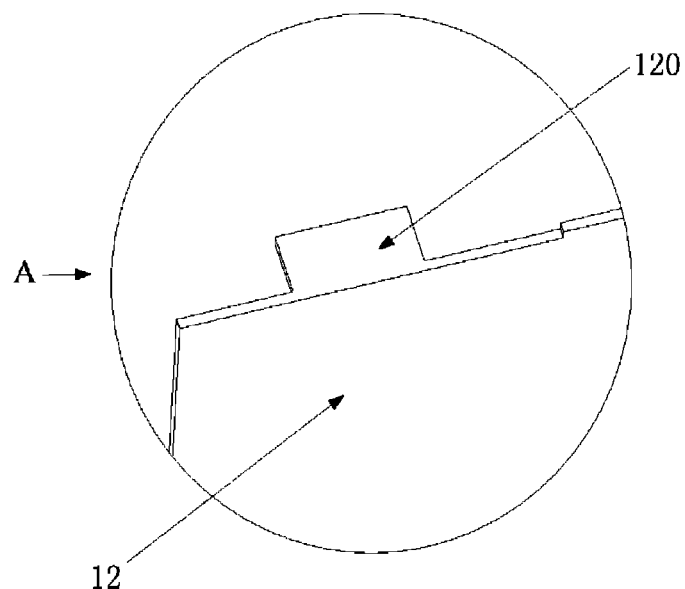
FIG. 3 is an enlarged view of the reflector shown encircled in A of FIG. 2.
Figure 4:
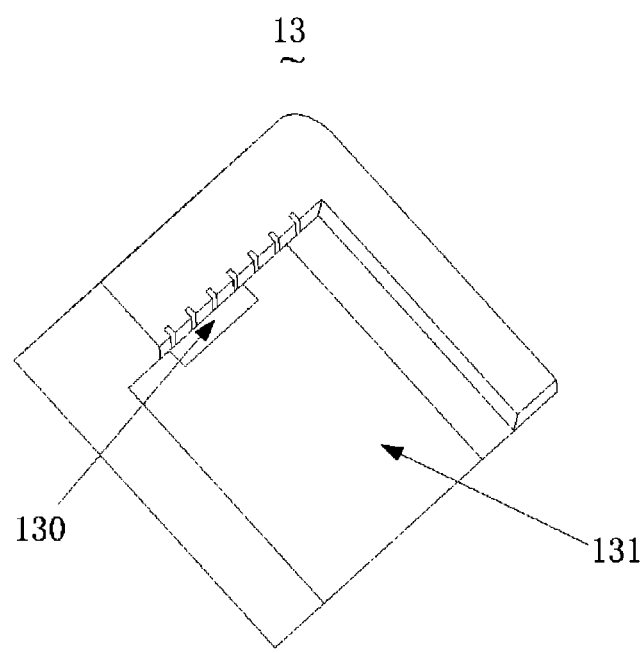
FIG. 4 is a perspective view of the elastic member used in the backlight module made in accordance with the present invention.
Figure 5:
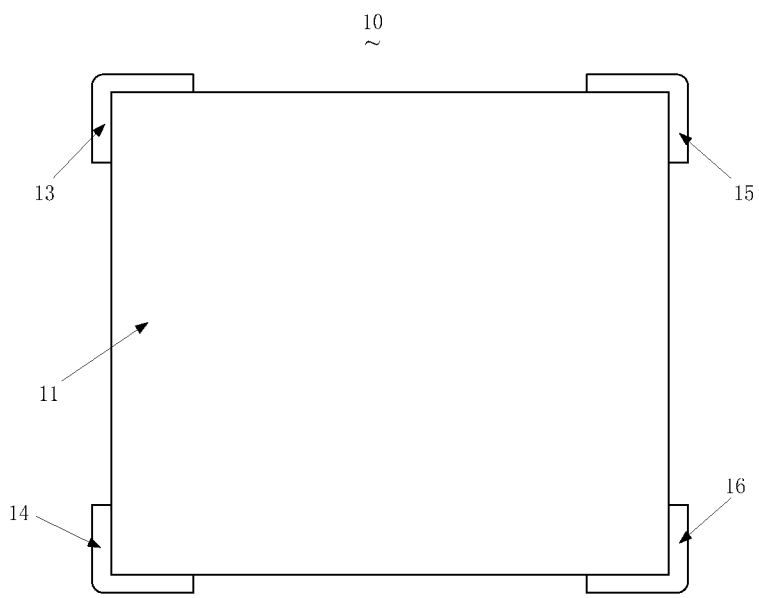
FIG. 5 is a plan view of a backlight module made in accordance with the present invention.

Referring to FIGS. 1, 2, 3, 4, and 5. FIG. 1 is a partial, cross sectional view of a backlight module 10 made in accordance with the present after it is assembled. FIG. 2 is a perspective view of a reflector 12 used in the backlight module 10 made in accordance with the present invention. FIG. 3 is an enlarged view of the reflector 12 shown encircled in A of FIG. 2. FIG. 4 is a perspective view of the elastic members 13, 14, 15, and 16 used in the backlight module made in accordance with the present invention. FIG. 5 is a plan view of a backlight module made in accordance with the present invention.

The backlight module 10 includes a waveguide 11, a reflector 12, and a plurality of elastic members 13, 14, 15 and 16.

The plurality of elastic members 13, 14, 15 and 16 are arranged on four corners of the waveguide 11 so as to provide a support to the waveguide. For convenience and simplicity, only one of the four elastic members 13, 14, 15 and 16 will be describe for illustration. The reflector 12 is arranged on the waveguide 11 lacing the elastic member 13. The elastic member 13 is provided with at least a slot 130 facing the reflector 12. The reflector 12 is provided with a tab 120 corresponding to the slot 130 of the reflector 13, and the tab 120 can be securely retained within the slot 130. A dotted line is arranged between the tab 120 and the reflector 12 such that the tab 120 can be readily folded. The angle between the tab 120 and the reflector 12 can be 90 degrees or slightly larger than 90 degrees. The slot 130 can be rectangular shape, and is arranged perpendicular to a surface of the elastic member 13 facing the waveguide 12. It should be noted that the slot 130 can be other shape, and no limitation is imposed thereto. In other embodiments, the slot 130 is not required to be defined at all of the elastic members 13, 14, 15 and 16, while only one or two of the elastic members 13, 14, 15 and 16 can be defined with the slot 130. The arrangement of the slot 130 can be readily defined according to the field requirements. Once the elastic members 14, 15 and 16 are to define with a slot 130, they can be identical to the slot 130 defined on the elastic members 13. The reflector 12 is defined with the tab 120 at its peripheral corresponding, to the position of slot 130.

In other embodiment, the elastic members 13, 14, 15 and 16 can be designated as the first elastic member 13, the second elastic member 14, the third elastic member 15, and the fourth elastic member 16, and arranged on four corners of the waveguide 11. A description will be given with respect to one of the first, second, third and fourth elastic members 13, 14, 15 and 16. The first elastic member 13 has a cubic configuration, and a corner has been removed to create a trough 131. The waveguide 11 has rectangular configuration and no need to cut. A corner of the waveguide 11 is matched with the trough 131 of the elastic member 13 and properly disposed within the trough 131. The configuration of the second elastic member 14, the third elastic member 15, and the fourth elastic member 16 is identical to the first elastic member 13. By providing the trough 131 on the first, second, third and fourth elastic members 13, 14, 15 and 16 and arranging the first, second, third and fourth elastic members 13, 14, 15 and 16 to the four corners so as to support the waveguide 11. The slot 130 of the first elastic, member 1$ is further defined on a bottom of sidewall of the trough 131. Similarly, the second, third, and fourth elastic members 14, 15 and 16 are also defined with a slot 130 on the bottom of the sidewall of the trough 131. The reflector 12 is provided with a tab 120 corresponding to each of the slot 130 of the first, second, third and fourth elastic members 13, 14, 15 and 16. Alternatively, the slot 130 defined on each of the first, second, third and fourth elastic members 13, 14, 15 and 16 can be multiple. The quantity of the tab 120 on the reflector 12 can be determined according to the quantity of the slots 130 of the first, second, third and fourth elastic members 13, 14, 15 and 16. Alternatively, the first, second, third and fourth elastic members 13, 14, 15 and 16 can be integrally formed to create a common platform to support the waveguide 11. No limitation will be given here. Wherein the first, second, third and fourth elastic members 13, 14, 15 and 16 can be made from rubber and other elastic material. In addition, the first, second, third and fourth elastic members 13, 14, 15 and 16 can be defined with vertical wells so as to absorb the expansion of the waveguide resulted from the humidity.

It can be readily understood that the present invention utilizes a plurality of cubit elastic members 13, 14, 15 and 16 defined with a slot 16 thereon so as to accommodate a tab 120 from the reflector 12. With the insertion of the tabs 120 from the reflector 12 into the slots 130 of the elastic member 13, 14, 15, and 16, the reflector 12 can be readily and reliably positioned. By this arrangement, the backlight module 10 become more reliable, and more suitable for narrow-boarder design. The utilization of reflector 12 is also enhanced.

Figure 6:
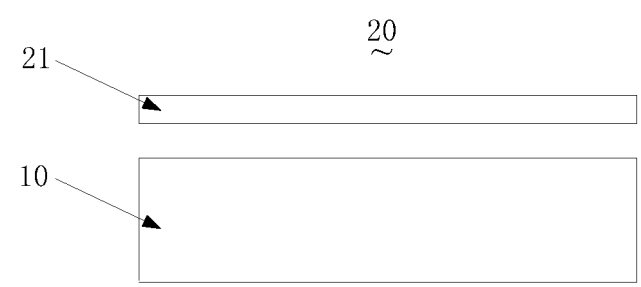
FIG. 6 is a cross sectional view of a liquid crystal display device made in accordance with the present invention.

Referring to FIGS. 3, 4, 5 and 6. FIG. 6 is a cross sectional view of a liquid crystal display device made in accordance with the present invention.

The present invention further provides a liquid crystal display device 20 which includes a displaying panel 21 and the backlight module 10.

The displaying panel 21 is disposed on a side of the waveguide 11 opposite to the reflector 12. The backlight module 10 is disposed below the displaying panel 21 so as to project a light source to the displaying panel 21. The plurality of elastic members 13, 14, 15 and 16 are arranged on four corners of the waveguide 11 so as to provide a support to the waveguide. For convenience and simplicity, only one of the four elastic members 13, 14, 15 and 16 will be describe for illustration. The reflector 12 is arranged on the waveguide 11 facing the elastic member 13. The elastic member 13 is provided with at least a slot 130 facing the reflector 12. The reflector 12 is provided with a tab 120 corresponding to the slot 130 of the reflector 13, and the tab 120 can be securely retained within the slot 130. A dotted line is arranged between the tab 120 and the reflector 12 such that the tab 120 can be readily folded. The angle between the tab 120 and the reflector 12 can be 90 degrees or slightly larger than 90 degrees. The skit 130 can be rectangular shape, and is arranged perpendicular to a surface of the elastic member 13 facing the waveguide 12. It should be noted that the slot 130 can be other shape, and no limitation is imposed thereto. In other embodiments, the slot 130 is not required to be defined at all of the elastic members 13, 14, 15 and 16, while only one or two of the elastic members 13, 14, 15 and 16 can be defined with the slot 130. The arrangement of the slot 130 can be readily defined according to the field requirements. Once the elastic members 14, 15 and 16 are to define with a slot 130, they can be identical to the slot 130 defined on the elastic members 13. The reflector 12 is defined with the tab 120 at its peripheral corresponding to the position of slot 130. The liquid crystal display device 20 can be a Thin Film Transistor-Liquid Crystal Display. It should be understood that it can be other type of liquid crystal display device, no limitation should be imposed hereof.

In other embodiment, the elastic members 13, 14, 15 and 16 can be designated as the first elastic member 13, the second elastic member 14, the third elastic member 15, and the fourth elastic member 16, and arranged on four corners of the waveguide 11. A description will be given with respect to one of the first, second, third and fourth elastic members 13, 14, 15 and 16. The first elastic member 13 has a cubic configuration, and a corner has been removed to create a trough 131. The waveguide 11 has rectangular configuration and no need to cut. A corner of the waveguide 11 is matched with the trough 131 of the elastic member 13 and properly disposed within the trough 131. The configuration of the second elastic member 14, the third elastic member 15, and the fourth elastic member 16 is identical to the first elastic member 13. By providing the trough 131 on the first, second, third and fourth elastic members 13, 14, 15 and 16 and arranging the first, second, third and fourth elastic members 13, 14, 15 and 16 to the four corners so as to support the waveguide 11. The slot 130 of the first elastic member 13 is further defined on a bottom of sidewall of the trough 131. Similarly, the second, third, and fourth elastic members 14, 15 and 16 are also defined with a slot 130 on the bottom of the sidewall of the trough 131. The reflector 12 is provided with a tab 120 corresponding to each of the slot 130 of the first second, third and fourth elastic members 13, 14, 15 and 16. Alternatively, the slot 130 defined on each of the first, second, third and fourth elastic members 13, 14, 15 and 16 can be multiple. The quantity of the tab 120 on the reflector 12 can be determined, according to the quantity of the slots 130 of the first, second, third and fourth elastic members 13, 14, 15 and 16. Alternatively, the first, second, third and fourth elastic members 13, 14, 15 and 16 can be integrally formed to create a common platform to support the waveguide 11. No limitation will be given here. Wherein the first, second, third and fourth elastic members 13, 14, 15 and 16 can be made from rubber and other elastic material. In addition, the first, second, third and fourth elastic members 13, 14, 15 and 16 can be defined with vertical wells so as to absorb the expansion of the waveguide resulted from the humidity.

It can be readily understood that the present invention utilizes a plurality of cubit elastic members 13, 14, 15 and 16 defined with a slot 16 thereon so as to accommodate a tab 120 from the reflector 12. With the insertion of the tabs 120 from the reflector 12 into the slots 130 of the elastic member 13, 14, 15, and 16, the reflector 12 can be readily and reliably positioned. By this arrangement, the backlight module 10 become more reliable, and more suitable for narrow-boarder design. The utilization of the reflector 12 is also enhanced.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the dams of the present invention.

The invention claimed is:

1. A backlight module, comprising:
   a waveguide, a reflector, and elastic members;
   wherein the elastic members are used to arranged on corners of the waveguide, and the reflector is arranged on a side of the waveguide facing the elastic members;
   wherein each of the elastic members is provided with a slot in a surface facing the reflector, and the reflector is provided with tabs corresponding to each of the slots so as to be securely received within the slots;
   wherein a dotted line is arranged between each of the tabs and the reflector; and
   wherein the slot has a rectangular shape and is perpendicular to a surface of the waveguide facing the reflector.

2. The backlight module as recited in claim 1, wherein the elastic members are made from rubber.

3. The backlight module as recited in claim 1, wherein the elastic member has a cubic configuration, and a corner is removed to create a cube with trough, and the slot is defined at a bottom of a sidewall of the trough.

4. A backlight module comprising:
   a waveguide, a reflector, and elastic members;
   wherein the elastic members are used to arranged on corners of the waveguide, and the reflector is arranged on a side of the waveguide being the elastic members; and
   wherein each of the elastic members is provided with a slot in a surface being the reflector, and the reflector is provided with tabs corresponding to each of the slots so as to be securely received within the slots.

5. The backlight module as recited in claim 4, wherein a dotted line is arranged between each of the tabs and the reflector.

6. The backlight module as recited in claim 4, wherein the slot has a rectangular shape and is perpendicular to a surface of the waveguide facing the reflector.

7. The backlight module as recited in claim 4, wherein the elastic members are made from rubber.

8. The backlight module as recited in claim 4, wherein the elastic member has a cubic configuration, and a corner is removed to create a cube with trough, and the slot is defined at a bottom of a sidewall of the trough.

9. A liquid crystal display device, comprising:
   a displaying panel disposed in a position of a waveguide opposite to a reflector;
   a backlight module, disposed below the displaying panel, and including
   a waveguide, a reflector, and elastic members;
   wherein the elastic members are used to arranged on corners of the waveguide, and the reflector is arranged on a side of the waveguide facing the elastic members; and
   wherein each of the elastic members is provided with a slot in a surface facing the reflector, and the reflector is provided with tabs corresponding to each of the slots so as to be securely received within the slots.

10. The backlight module as recited in claim 9, wherein a dotted line is arranged between each of the tabs and the reflector.

11. The backlight module as recited in claim 9, wherein the slot has a rectangular shape and is perpendicular to a surface of the waveguide facing the reflector.

12. The backlight module as recited in claim 9, wherein the elastic members are made from rubber.

13. The backlight module as recited in claim 9, wherein the elastic member has a cubic configuration, and a corner is removed to create a cube with trough, and the slot is defined at a bottom of a sidewall of the trough.

* * * * *